United States Patent
Yi et al.

(10) Patent No.: US 10,797,338 B2
(45) Date of Patent: Oct. 6, 2020

(54) FLEXIBLE SECONDARY BATTERY

(71) Applicant: Samsung SDI Co., Ltd., Yongin-si, Gyeonggi-do (KR)

(72) Inventors: Jeong-Doo Yi, Yongin-si (KR); Junwon Suh, Yongin-si (KR); Juhee Sohn, Yongin-si (KR); Hyunhwa Song, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1100 days.

(21) Appl. No.: 14/951,321

(22) Filed: Nov. 24, 2015

(65) Prior Publication Data
US 2016/0149253 A1 May 26, 2016

(30) Foreign Application Priority Data
Nov. 24, 2014 (KR) .................. 10-2014-0164422

(51) Int. Cl.
| | |
|---|---|
| *H01M 2/26* | (2006.01) |
| *H01M 10/02* | (2006.01) |
| *H01M 10/04* | (2006.01) |
| *H01M 2/22* | (2006.01) |

(52) U.S. Cl.
CPC ............. *H01M 10/02* (2013.01); *H01M 2/22* (2013.01); *H01M 2/26* (2013.01); *H01M 10/0436* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 2011/0076544 A1* | 3/2011 | Maeda | H01M 2/18 429/136 |
| 2012/0121968 A1* | 5/2012 | Nakagawa | H01M 2/26 429/163 |
| 2013/0011717 A1 | 1/2013 | Yotsumoto | |
| 2014/0079979 A1 | 3/2014 | Kwon et al. | |

FOREIGN PATENT DOCUMENTS

| | | |
|---|---|---|
| KR | 10-2011-0120022 A | 11/2011 |
| KR | 10-2012-0084316 A | 7/2012 |
| KR | 10-2014-0027775 A | 3/2014 |

* cited by examiner

*Primary Examiner* — Haixia Zhang
(74) *Attorney, Agent, or Firm* — Knobbe Martens Olson & Bear LLP (57) ABSTRACT

A flexible secondary battery includes: an electrode stack assembly including a first electrode plate, a second electrode plate, and a separator between the first electrode plate and the second electrode plate; a first electrode tab electrically connected to the first electrode plate; and a second electrode tab electrically connected to the second electrode plate. One end of the first electrode tab and one end of the second electrode tab are disposed inside the electrode stack assembly and are stacked together with the first electrode plate, the second electrode plate, and the separator to form the electrode stack assembly. A first welding part is formed between, and binds, at least one of i) a portion of the first electrode plate and a portion of the first electrode tab and ii) a portion of the second electrode plate and a portion of the second electrode tab.

6 Claims, 5 Drawing Sheets

FLEXIBLE SECONDARY BATTERY

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims the benefit of Korean Patent Application No. 10-2014-0164422, filed on Nov. 24, 2014, in the Korean Intellectual Property Office, the disclosure of which is incorporated herein in its entirety by reference.

BACKGROUND

Field

This disclosure relates to a flexible secondary battery.

Description of the Related Technology

With the technological advances in the field of electronic devices, the markets for mobile electronic devices have rapidly grown. Mobile phones, game machines, portable multimedia players (PMPs), MPEG audio layer-3 (MP3) players, smartphones, smart pads, e-book readers, flexible tablet computers, wearable medical devices, and the like have been extensively developed and widely used.

As the markets for mobile electronic devices have grown, there has been an increasing need for batteries suitable for driving the mobile electronic devices. Devices that are flexible in their use, movement, and storage as well as high durability thereof against impacts are also in increasing demand. Accordingly, the demand for batteries that can provide the flexibility is also increasing.

SUMMARY

This disclosure relates to a flexible secondary battery capable of maintaining stability even after repeatedly bent or warped.

According to one or more exemplary embodiments, a flexible secondary battery includes: an electrode stack assembly including a first electrode plate, a second electrode plate, and a separator between the first electrode plate and the second electrode plate; a first electrode tab electrically connected to the first electrode plate; and a second electrode tab electrically connected to the second electrode plate, wherein one end of the first electrode tab and one end of the second electrode tab are disposed inside the electrode stack assembly and are stacked together with the first electrode plate, the second electrode plate, and the separator to form the electrode stack assembly, a part that the first electrode plate and the second electrode tab contact each other and another part that the second electrode plate and the second electrode tab contact each other.

The first welding part may be formed on a surface of the electrode stack assembly.

The first welding part may penetrate the surface of the electrode stack assembly, the first electrode plate, the second electrode plate, and the separator.

The first electrode plate may include a first active material part coated with a first active material and a first uncoated part uncoated with the first active material, and the second electrode plate may include a second active material part coated with a second active material and a second uncoated part uncoated with the second active material.

The electrode stack assembly may have a rectangular shape, the first uncoated part may include a first protruding part protruding from the rectangular electrode stack assembly, and a first embedded part that is a portion of the first uncoated part different from the first protruding part, and the second uncoated part may include a second protruding part protruding from the rectangular electrode stack assembly, and a second embedded part that is a portion of the second uncoated part different from the second protruding part.

The first uncoated part may be located at a position where the first electrode plate and the second electrode tab contact each other, and the second uncoated part may be located at a position where the second electrode plate and the second electrode tab contact each other.

The first electrode tab and the second electrode tab may be disposed inside the first protruding part and the second protruding part, respectively.

At least one of the first embedded part and the second embedded part may be fixed by a welding process.

The first electrode tab may be disposed on the first protruding part and the second electrode tab may be disposed on the second protruding part.

A least one of the first protruding part, the first embedded part, the second protruding part, and the second embedded part may be fixed by a welding process.

According to one or more exemplary embodiments, a flexible secondary battery includes: an electrode stack assembly including a first electrode plate, a second electrode plate, and a separator between the first electrode plate and the second electrode plate; a first electrode tab electrically connected to the first electrode plate; and a second electrode tab electrically connected to the second electrode plate, wherein one end of the first electrode tab and one end of the second electrode tab are disposed inside the electrode stack assembly and are stacked together with the first electrode plate, the second electrode plate, and the separator to form the electrode stack assembly, at least one of a first welding part and a second welding part is formed on at least one of the first electrode plate and the second electrode plate, and one end of the electrode stack assembly, which contacts the first electrode tab and the second electrode tab, is fixed by a fixing member.

At least one of the first welding part and the second welding part may be formed on a surface of the electrode stack assembly.

At least one of the first welding part and the second welding part may penetrate the surface of the electrode stack assembly, the first electrode plate, the second electrode plate, and the separator.

The first electrode plate may include a first active material part coated with a first active material and a first uncoated part uncoated with the first active material, and the second electrode plate may include a second active material part coated with a second active material and a second uncoated part uncoated with the second active material.

The fixing member may be an adhesive or an adhesive tape between the first uncoated part and the separator and between the separator and the second uncoated part.

The first uncoated part may include a first protruding part protruding from the rectangular electrode stack assembly, and a first embedded part that is a portion of the first uncoated part different from the first protruding part, and the second uncoated part may include a second protruding part protruding from the rectangular electrode stack assembly, and a second embedded part that is a portion of the second uncoated part different from the second protruding part.

The first electrode tab may be disposed on the first protruding part and the second electrode tab may be disposed on the second protruding part.

The second welding part may be formed on at least one of the first protruding part and the second protruding part, the second welding part may be disposed on at least one of a location where the first electrode tab and the second electrode tab are disposed and a location where the first electrode tab and the second electrode tap are not disposed.

The first electrode tab and the second electrode tab may be disposed inside the first protruding part and the second protruding part, respectively.

The first welding part may be formed at positions where the first electrode tab and the second electrode tab contact the first embedded part and the second embedded part, respectively, and the first welding part may bind one end of the electrode stack assembly together with the fixing member.

The second welding part may be formed on at least one of the first protruding part and the second protruding part, the second welding part may be disposed on at least one of a location where the first electrode tab and the second electrode tab are disposed and a location where the first electrode tab and the second electrode tap are not disposed.

DETAILED DESCRIPTION OF CERTAIN INVENTIVE EMBODIMENTS

Reference will now be made in detail to the certain embodiments of the present disclosure examples of which are illustrated in the accompanying drawings. Various aspects of the present disclosure may be embodied in many different forms and should not be construed as being limited to the example embodiments set forth herein. Rather, these example embodiments of the disclosure are provided so that this disclosure will be thorough and complete and will convey various aspects of the disclosure to those skilled in the art As used herein, the term "and/or" includes any and all combinations of one or more of the associated listed items. Expressions such as "at least one of" when preceding a list of elements, modify the entire list of elements and do not modify the individual elements of the list.

Hereinafter, exemplary embodiments will be described in detail with reference to the accompanying drawings. Like elements are assigned with like reference numerals, and redundant descriptions thereof will be omitted.

It will be understood that although the terms "first", "second", etc. may be used herein to describe various components, these components should not be limited by these terms. These components are only used to distinguish one component from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

Sizes of elements in the drawings may be exaggerated for convenience of explanation. In the drawings, the thickness of layers and regions are exaggerated for clarity. In other words, since sizes and thicknesses of components in the drawings are arbitrarily illustrated for convenience of explanation, the following embodiments are not limited thereto.

Figure 1:
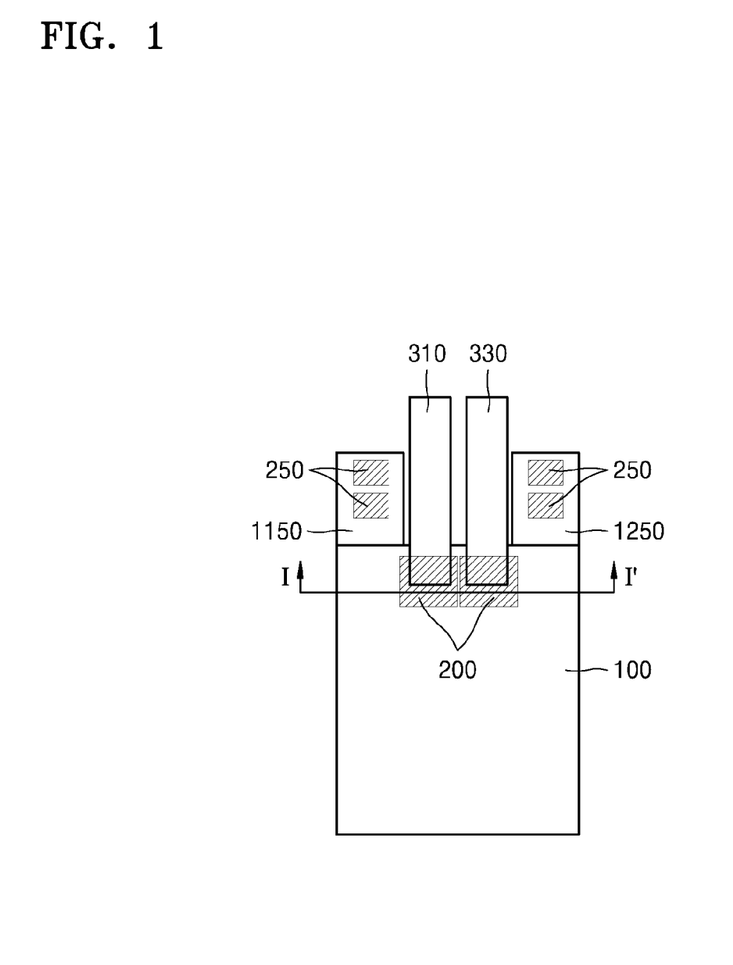
FIG. 1 is a plan view of a flexible secondary battery according to an exemplary embodiment.
Figure 2:
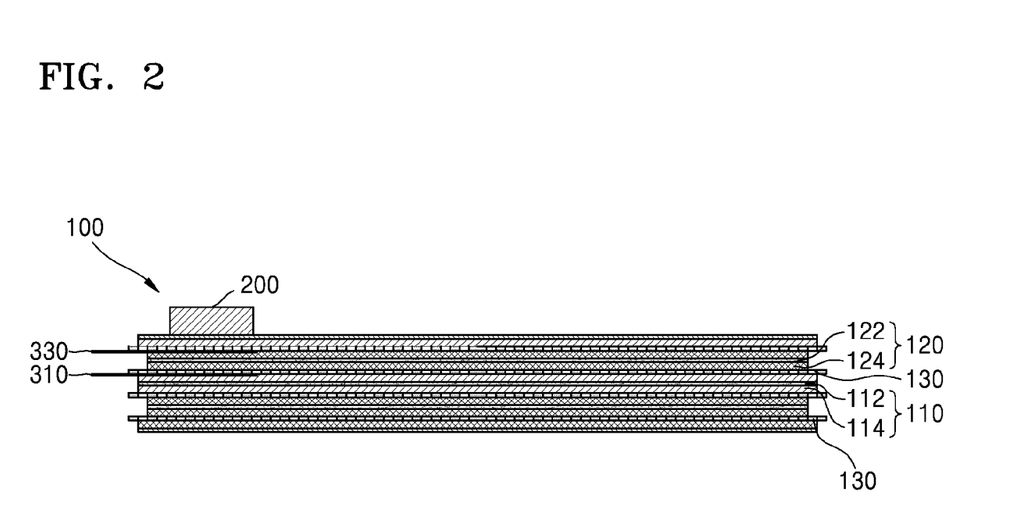
FIG. 2 is a cross-sectional view taken along line I-I' of FIG. 1, according to an exemplary embodiment.
Figure 3:
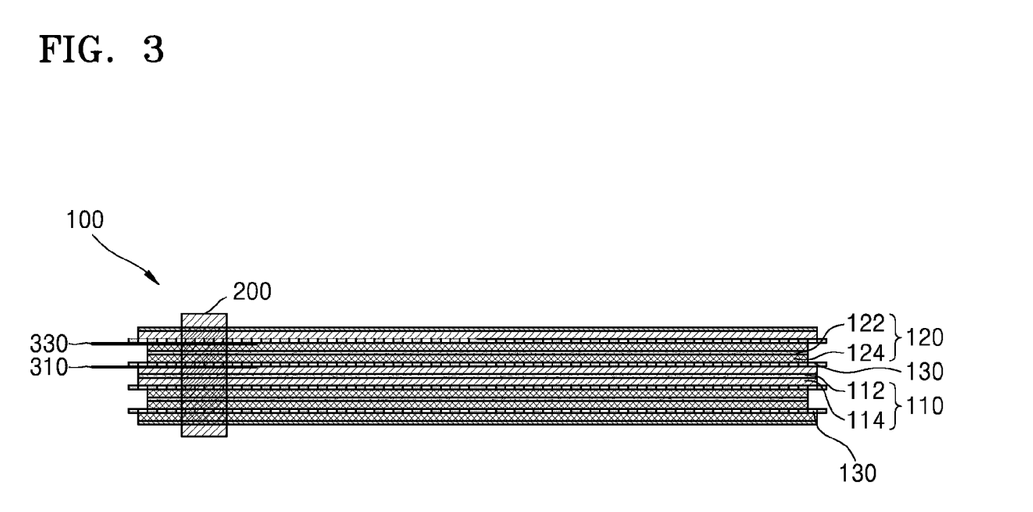
FIG. 3 is a cross-sectional view taken along line I-I' of FIG. 1, according to an exemplary embodiment in FIG. 1.

FIG. 1 is a plan view of a flexible secondary battery according to an exemplary embodiment. FIG. 2 is a cross-sectional view taken along line I-I' of FIG. 1, according to an exemplary embodiment. FIG. 3 is a cross-sectional view taken along line I-I' of FIG. 1, according to another an exemplary embodiment.

Referring to FIGS. 1 to 3, the flexible secondary battery according to the exemplary embodiment may include an electrode stack assembly 100.

The electrode stack assembly 100 may include a first electrode plate 110, a second electrode plate 120, and a separator 130 between the first electrode plate 110 and the second electrode plate 120. The electrode stack assembly 100 of the flexible secondary battery according to the exemplary embodiment may have a plurality of stack structures each including the first electrode plate 110, the second electrode plate 120, and the separator 130.

The first electrode plate 110 may be either a cathode film or an anode film. When the first electrode plate 110 is a cathode film, the second electrode plate 120 may be an anode film. On the contrary, when the first electrode plate 110 is an anode film, the second plate 120 may be a cathode film.

The first electrode film 110 may include a first metallic current collector 112, a first active material part 114 coated with a first active material on the surface of the first metallic current corrector 112, and a first uncoated part (not illustrated)—uncoated with the first active material thereon. Similarly, the second electrode plate 120 may include a second metallic current collector 122, a second active material part 124 coated with a second active material on the surface of the second metallic current collector 122, and a second uncoated part (not illustrated) uncoated with the second active material thereon.

When the first electrode plate 110 is a cathode film, the first metallic current collector 112 may be a cathode current collector and the first active material part 114 may be a cathode active material part. When the second electrode plate 120 is an anode film, the second metallic current collector 122 may be an anode current collector and the second active material part 124 may be an anode active material part.

The cathode current collector may include a metal selected from the group consisting of aluminum, stainless steel, titanium, copper, silver, and mixtures thereof. The cathode active material part may include a cathode active material, a binder, and a conductive agent.

The cathode active material may include a material capable of reversibly absorbing and emitting lithium ions. For example, the cathode active material may include at least one selected from the group consisting of lithium transition metal oxide, nickel sulfide, copper sulfide, sulfur, iron oxide, and vanadium oxide. Examples of the lithium transition metal oxide may include lithium cobalt oxide, lithium nickel oxide, lithium nickel cobalt oxide, lithium nickel cobalt aluminate, lithium nickel cobalt manganese oxide, lithium manganese oxide, and lithium iron phosphate.

The binder may include at least one selected from the group consisting of a polyvinylidene fluoride-based binder, such as polyvinylidene fluoride, a vinylidene fluoride/hexafluoropropylene copolymer, and a vinylidene fluoride/tetraethylammonium tetrafluroethylene copolymer; a carboxymethylcellulose-based binder, such as sodium-carboxymethylcellulose and lithium-carboxymethylcellulose; an acrylate-based binder, such as a polyacrylic acid, a lithium-polyacrylic acid, acrylate, polyacrylate, polymethyl methacrylate, and polybutyl acrylate; polyamide-imide; polytetrafluoroethylene; polyethylene oxide; polypyrrole; lithium-Nafion; and a styrene butadiene rubber-based polymer.

The conductive agent may include at least one selected from the group consisting of a carbon-based conductive agent, such as a carbon black, a carbon fiber, and graphite; a conductive fiber, such as a metal fiber; metallic powder, such as a carbon fluoride powder, an aluminum powder, and a nickel powder; a conductive whicker, such as zinc oxide and potassium titanate; a conductive metal oxide, such as titanium oxide; and a conductive polymer, such as a polyphenylene derivative.

The anode current collector may include at least one selected from the group consisting of copper, stainless steel, nickel, aluminum, and titanium. The anode active material part may include an anode active material, a binder, and a conductive agent.

The anode active material may include a material capable of being alloyed with lithium or a material capable of reversibly absorbing and emitting lithium ions. For example, the anode active material may include at least one selected from the group consisting of a metal, a carbon-based material, a metal oxide, or lithium metal nitride.

The metal may include at least one selected from the group consisting of lithium, silicon, magnesium, calcium, aluminum, germanium, tin, lead, arsenic, antimony, bismuth, silver, gold, zinc, cadmium, mercury, copper, iron, nickel, cobalt, and indium.

The carbon-based material may include at least one selected from the group consisting of graphite, a graphite carbon fiber, coke, mesocarbon microbead (MCMB), polyacene, a pitch-based carbon fiber, and hard carbon.

The metal oxide may include at least one selected from the group consisting of lithium titanium oxide, titanium oxide, molybdenum oxide, niobium oxide, iron oxide, tungsten oxide, tin oxide, an amorphous tin oxide compound, silicon mono-oxide, cobalt oxide, and nickel oxide.

The binder and the conductive agent may use the same materials as the binder and the conductive agent included in the cathode active material part.

The cathode film or the anode film may be formed by coating the active material on the metallic current collector through various methods, and the method of coating the active material is not particularly limited.

As described above, the first electrode plate 110 may include the first active material part 114 coated with the first active material and the first uncoated part (not illustrated) uncoated with the first active material, depending on the coating or non-coating of the active material.

In addition, the first uncoated part (not illustrated) may include a first protruding part 1150 and a first embedded part (not illustrated) according to the position thereof.

As illustrated in FIG. 1, the electrode stack assembly 100 may have a rectangular shape. A portion of the first uncoated part (not illustrated) of the first electrode plate 110 may protrude from the rectangular electrode stack assembly 100.

The protruding portion of the first uncoated part (not illustrated) may be referred to as the first protruding part 1150, and the remaining portion of the first uncoated part may be referred to as the first embedded part.

Therefore, the first embedded part is disposed inside the rectangular electrode stack assembly 100 and may correspond to the first uncoated part disposed inside the rectangular electrode stack assembly 100.

As in the first electrode plate 110, the second electrode plate 120 may include a second active material part 124 and a second uncoated part, depending on the coating or non-coating of the active material. The second uncoated part may include a second protruding part 1250 and a second embedded part (not illustrated) according to the position thereof.

Since the second protruding part 1250 and the second embedded part are substantially the same as the first protruding part 1150 and the first embedded part, a description thereof will not be repeated.

Therefore, as illustrated in FIG. 1, the rectangular electrode stack assembly 100 is provided to protrude in an elongated shape in a longitudinal direction in which a first electrode tab 310 and a second electrode tab 330 are connected to each other.

At this time, a structure that protrudes from the first electrode plate 110 to the outside of the rectangular electrode stack assembly 100 in the longitudinal direction may be referred to as the first protruding part 1150, and a structure that protrudes from the second electrode plate 120 to the outside of the rectangular electrode stack assembly 100 in the longitudinal direction may be referred to as the second protruding 1250.

In addition, both of the first protruding part 1150 and the second protruding part 1250 may be uncoated parts.

The separator 130 may be a porous polymer film, such as a polyethylene film or a polypropylene film. The separator 130 may be a woven type separator or a non-woven type separator that includes a polymer fiber. The separator 130 may include ceramic particles or a solid polymer electrolyte. The separator 130 may be a separate film or may be manufactured by forming a nonconductive porous layer on the first electrode plate 110 or the second electrode plate 120.

The separator 130 may electrically separate the first electrode plate 110 from the second electrode plate 120. The separator 130 need not necessarily have the same shape as the first electrode plate 110 or the second electrode plate 120.

The electrode stack assembly 110 may further include a first electrode tab 310 electrically connected to the first uncoated part and a second electrode tab 330 electrically connected to the second uncoated part. The first electrode tab 310 may be an extension from the first metallic current collector 112 and the second electrode tab 330 may be an extension from the second metallic current collector 122.

As illustrated in FIG. 1, one end of the first electrode tab 310 and one end of the second electrode tab 330 may be disposed inside the electrode stack assembly 100. Therefore, one end of the first electrode tab 310 and one end of the second electrode 330 may be stacked together with the first electrode plate 110, the second electrode plate 120, and the separator 130 to form the electrode stack assembly 100.

Therefore, the first electrode tab 310 and the second electrode tab 330 may function to fix the first electrode plate 110, the second electrode plate 120, and the separator 130.

The flexible secondary battery according to an exemplary embodiment may further include a first welding part 200 at both or either of a position where the first electrode plate 110 and the first electrode tab 310 contact each other and a position where the second electrode plate 120 and the second electrode tab 330 contact each other.

The first electrode tab 310 and the second electrode tab 330 may be connected to the uncoated part. Therefore, the first welding part 200 also may be formed in the uncoated part.

The first welding part 200 may be formed by a welding process. The first welding part 200 may bind one end of the electrode stack assembly 100.

As illustrated in FIG. 1, one end of the first electrode tab 310 and one end of the second electrode tab 330 may be disposed inside the electrode stack assembly 100, be electrically connected to the first electrode plate 110 and the second electrode plate 120, and be stacked with the first electrode plate 110 and the second electrode plate 120. In addition, by forming the first welding part 200 in the connection portion, the electrode stack assembly 100 may be bound to the first electrode tab 310 and the second electrode tab 330 at a time.

The first electrode plate 110 and the second electrode plate 120, to which one end of the first electrode tab 310 and one end of the second electrode tab 330 are connected, may be the first embedded part and the second embedded part that are the uncoated parts.

In the flexible secondary battery, repeated bending may cause slipping in the first electrode plate, the second electrode plate, and the separator, which constitute the electrode stack assembly. Thus, the flexible secondary battery may be deformed and the electrode plates provided with the uncoated parts may be broken.

On the contrary, in the flexible secondary battery according to the exemplary embodiment, the first welding parts 200 may be formed at the positions where the first electrode tab 310 and the second electrode tab 330 are connected to the first electrode plate 110 and the second electrode plate 120, respectively, and the electrode stack assembly 100 may be fixed by the first welding part 200 at a time.

Therefore, it is less likely that slipping will occur in the electrode stack assembly 100. Since one end of the electrode stack assembly 100 is fixed by a welding process, it is less likely that the uncoated parts, in which the first electrode plate 310 and the second electrode tab 330 are disposed, will be broken.

As illustrated in FIG. 1, the first electrode tab 310 and the second electrode tab 330 may be disposed between the first protruding part 1150 and the second protruding part 1250.

In the flexible secondary battery according to the exemplary embodiment, the first electrode tab 310 and the second electrode tab 330 may not contact the first protruding part 1150 and the second protruding part 1250, and may contact the first embedded part and the second embedded part disposed inside the electrode stack assembly 100.

The positions of the first electrode tab 310 and the second electrode tab 330 are not limited to the above-described exemplary embodiment.

As illustrated in FIG. 1, the first welding parts 200 may be separately formed at the positions to which the first electrode tab 310 and the second electrode tab 330 are connected, but the positions or the shapes of the first welding part 200 are not limited thereto.

In addition to the first welding parts 200 formed at the positions where the first electrode tab 310 and the second electrode tab 330 contact the first electrode plate 110 and the second electrode plate 120, respectively, welding parts may be further formed.

Therefore, as illustrated in FIG. 1, second welding parts 250 may be formed in the first protruding part 1150 and/or the second protruding part 1250. Since the first protruding part 1150 and the second protruding part 1250 are the uncoated parts, the second welding parts 250 may be formed on the first protruding part 1150 and/or the second protruding part 1250 by a welding process.

Two second welding parts 250 are illustrated in FIG. 1 as being formed in each of the first protruding part 1150 and the second protruding part 1250, but the number or positions of the second welding parts 250 are not limited thereto.

The first welding part 200 may be formed on the first embedded part and/or the second embedded part, to which the first electrode tab 310 and/or the second electrode tab 330 are connected, and may function to bind the electrode stack assembly 100 at a time.

As illustrated in FIG. 1, since the second welding parts 250 are formed on the first protruding 1150 and the second protruding part 1250, it is possible to effectively prevent the electrode plates of the uncoated parts from being broken even when the flexible secondary battery is bent.

Therefore, since the welding parts stably fix one end of the electrode stack assembly 100, it is possible to use the flexible secondary battery for a long time without breaking of the electrode plates even after the flexible secondary battery is repeatedly bent.

FIG. 2 is a cross-sectional view taken along line I-I of FIG. 1, according to an exemplary embodiment.

As illustrated in FIG. 2, the first welding part 200 may be formed on only the surface of the electrode stack assembly 100. Thus, when the first electrode tab 310 and/or the second electrode tab 330 are positioned in the peripheral portion on the surface of the electrode stack assembly 100 and are stacked together with the electrode stack assembly 100, the first welding part 200 may be formed on only the surface of the electrode stack assembly 100 by a welding process.

FIG. 3 is a cross-sectional view taken along line I-I of FIG. 1, according to another exemplary embodiment.

As illustrated in FIG. 3, the first welding part 200 may be formed on the surface of the electrode stack assembly 100 and also formed to penetrate the electrode stack assembly 100. For example, a welding process is performed such that the first welding part 200 is welded to penetrate the electrode stack assembly 100, thus binding the first electrode plate 110, the second electrode plate 120, and the separator 130, which constitute the electrode stack assembly 100.

In a case where the first welding part 200 is formed to penetrate the electrode stack assembly 100, since the electrode stack assembly 100 is fixed by welding, it is less likely that the flexible secondary battery will be deformed even after repeatedly bending.

Figure 4:
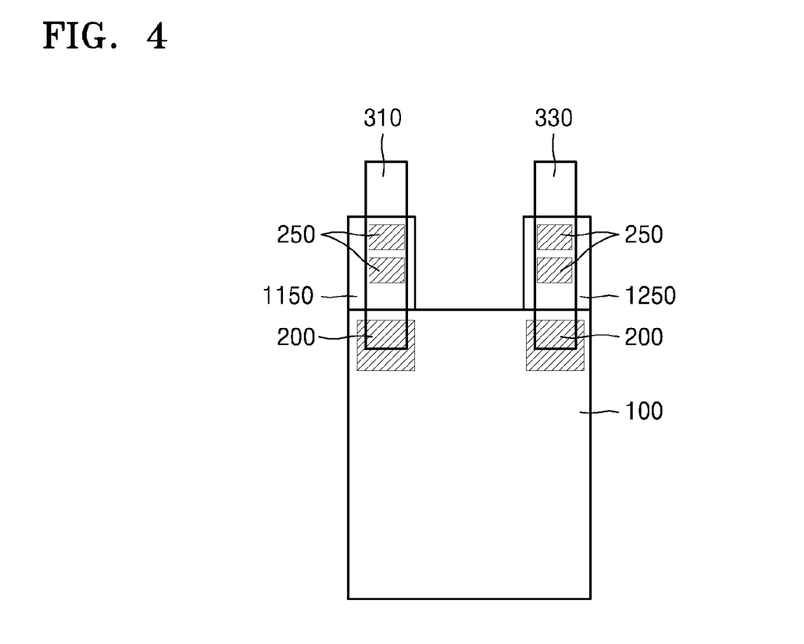
FIG. 4 is a plan view of a flexible secondary battery according to another exemplary embodiment.

FIG. 4 is a plan view of a flexible secondary battery according to another exemplary embodiment.

As illustrated in FIG. 4, a first electrode tab 310 and a second electrode tab 330 may be disposed on a first protruding part 1150 and a second protruding part 1250, respectively.

Even in such a case, first welding parts 200 may be formed at positions where the first electrode tab 310 and the second electrode tab 330 are connected to a first embedded part and a second embedded part. Since the first electrode tab 310 and the second electrode tab 330 are disposed inside the electrode stack assembly 100 and are stacked together with a first electrode plate 110, a second electrode plate 120, and a separator 130, one end of the electrode stack assembly 100 may be fixed by the first welding parts 200.

The flexible secondary battery according to the exemplary embodiment may further include second welding parts 250 in addition to the first welding parts 200.

The second welding parts 250 are formed on the first protruding part 1150 and/or the second protruding part 1250. As illustrated in FIG. 4, since the first electrode tab 310 and the second electrode tab 330 are disposed on the first protruding part 1150 and the second protruding part 1250, respectively, the first and second electrode tabs 310 and 330 and the first and second protruding parts 1150 and 1250 may be welded together.

Thus, the second welding parts 250 may be formed by a welding process in such a state that the first electrode tab 310 is positioned on the first protruding part 1150. Similarly, the second welding parts 250 may be formed by a welding process in such a state that the second electrode tab 330 is positioned on the second protruding part 1250.

In addition to the formation of the first welding parts 200 to bind one end of the electrode stack assembly 100, the second welding parts 250 are additionally formed on the first protruding part 1150 and/or the second protruding part 1250, so that the first electrode tab 310 and/or the second electrode tab 330 are/is tightly fixed to the electrode stack assembly 100.

Consequently, even after the flexible secondary battery is repeatedly bent, it is less likely that the electrode plates of the uncoated parts will be broken. Furthermore, it is less likely that the flexible secondary battery will be deformed. Thus, the lifetime of the flexible secondary battery may be increased.

Two second welding parts 250 are illustrated in FIG. 4 as being formed in each of the first protruding part 1150 and the second protruding part 1250, but the number or positions of the second welding parts 250 are not limited thereto.

The welding parts may be formed in any uncoated part, regardless of positions, shapes, or number, without departing from the scope of the exemplary embodiment.

FIGS. 5 to 8 are plan views of flexible secondary batteries according to various exemplary embodiments.

Figure 5:
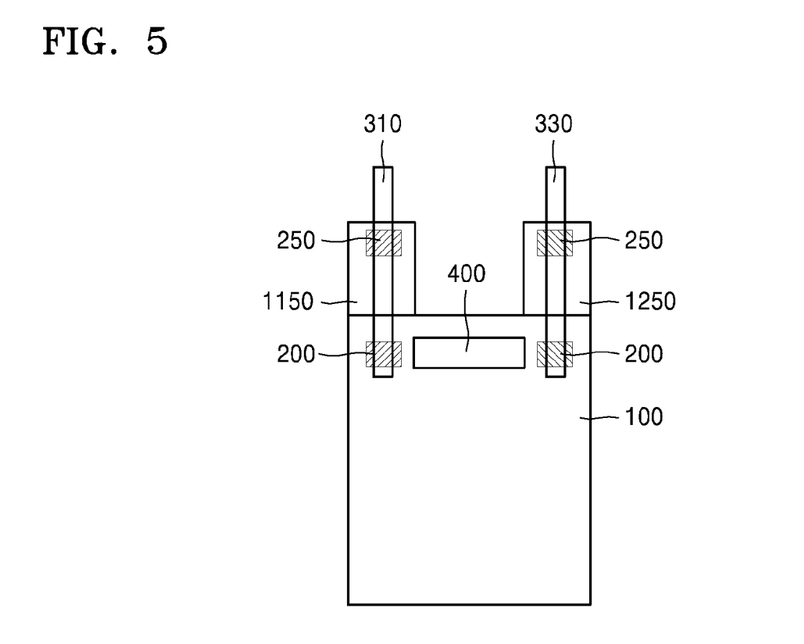
FIG. 5 is a plan view of a flexible secondary battery according to another exemplary embodiment.

As in the above-described exemplary embodiment, the flexible secondary battery of FIG. 5, according to an exemplary embodiment, may include an electrode stack assembly 100. The electrode stack assembly 100 may include a first electrode plate 110, a second electrode plate 120, and a separator 130 between the first electrode plate 110 and the second electrode plate 120.

The electrode stack assembly 100 of the flexible secondary battery according to the exemplary embodiment may have a plurality of stack structures each including the first electrode plate 110, the second electrode plate 120, and the separator 130.

Since the shapes and functions of the first electrode plate 110, the second electrode plate 120, and the separator 130 are substantially the same as those of the above-described exemplary embodiments, a description thereof will not be repeated.

The first electrode plate 110 may include a first uncoated part uncoated with a first active material, and the second electrode plate 120 may include a second uncoated part uncoated with a second active material.

The electrode stack assembly 100 may further include a first electrode tab 310 electrically connected to the first uncoated part and a second electrode tab 330 electrically connected to the second uncoated part.

As described above, one end of the first electrode tab 310 and one end of the second electrode tab 330 may be disposed inside the electrode stack assembly 100. Accordingly, one end of the first electrode tab 310 and one end of the second electrode tab 330 may be stacked together with the first electrode plate 110, the second electrode plate 120, and the separator 130 to form the electrode stack assembly 100.

As illustrated in FIGS. 5 to 8, one end of the first electrode tab 310 and one end of the second electrode tab 330 may be disposed inside the rectangular electrode stack assembly 100. In this case, one end of the first electrode tab 310 and one end of the second electrode tab 330 are stacked together with the first electrode plate 110, the second electrode tab 120, and the separator 130.

In addition, the first electrode plate 110 and the second electrode plate 120, which contact the first electrode tab 310 and the second electrode tab 120, may be a first uncoated part and a second uncoated part, respectively. In particular, since the first electrode plate 110 and the second electrode plate 120 are the uncoated parts disposed inside the rectangular electrode stack assembly 100, the first electrode plate 110 and the second electrode plate 120 may be a first embedded part and a second embedded part, respectively.

The flexible secondary battery according to the exemplary embodiment may further include a fixing member 400.

The fixing member 400 may be formed at one end of the electrode stack assembly 100 so as to bind the electrode stack assembly 100. In particular, the fixing member 400 may be formed at an end of a side to which the first electrode plate 110 and the second electrode plate 120 are connected.

Since the flexible secondary battery is repeatedly bent, slipping may occur between the electrode plates and the separator of the electrode stack assembly. Consequently, the flexible secondary battery may be deformed. In order to prevent the deformation of the flexible secondary battery, it is necessary to fix the electrode stack assembly.

In the flexible secondary battery according to the exemplary embodiment, the fixing member 400 is provided at one end of the electrode stack assembly 100 and stably fixes one end of the electrode stack assembly 100, thus preventing the deformation of the flexible secondary battery.

As illustrated in FIGS. 5 to 8, the fixing member 400 may be an adhesive or an adhesive tape. The adhesive or the adhesive tape is merely an example of the fixing member 400, the fixing member 400 is not limited thereto. Any member may be used as the fixing member 400 as long as the member is capable of fixing the electrode stack assembly 100.

The flexible secondary battery according the exemplary embodiment may further include welding parts 200 and 250, separately from the fixing member 400 that binds the electrode stack assembly 100.

The welding parts 200 and 250 bond elements by a welding process. Since the welding parts 200 and 250 are substantially the same as those of the above-described exemplary embodiments, a description thereof will not be repeated.

In a case where the electrode stack assembly 100 is fixed by the fixing member 400, the electrode plates of the uncoated parts may be broken if the flexible secondary battery is repeatedly bent.

In such a case, since electrons are not moved any more, the flexible secondary battery loses function as a battery.

On the contrary, in the flexible secondary battery according to the exemplary embodiment, the welding parts 200 and 250 may provide an electron moving path.

Therefore, even when the electrode plates of the uncoated parts are broken, electrons may move through the welding parts 200 and 250. Thus, the flexible secondary battery may function as a battery.

As described above, the welding parts 200 and 250 may include first welding parts formed at positions where the first electrode tab 310 and the second electrode tab 330 are connected to the first embedded part and/or the second embedded part, and second welding parts 250 formed at other positions.

As illustrated in FIG. 5, the first electrode tab 310 and the second electrode tab 330 may be disposed on a first protruding part 1150 and a second protruding part 1250, respectively. At this time, the first welding parts 200 may be formed in the first embedded part and the second embedded part, respectively, which contact the first electrode tab 310 and the second electrode tab 330.

In addition, the fixing member 400 may be formed between the first welding parts 200.

One end of the electrode stack assembly 100 is fixed by the fixing member 400 and the first welding part 200. Therefore, even after the flexible secondary battery is repeatedly bent, the electrode stack assembly may be stably fixed, thus preventing the deformation of the flexible secondary battery.

In addition, as illustrated in FIG. 5, the second welding parts 250 may be further formed on the first protruding part 1150 and the second protruding part 1250.

Figure 6:
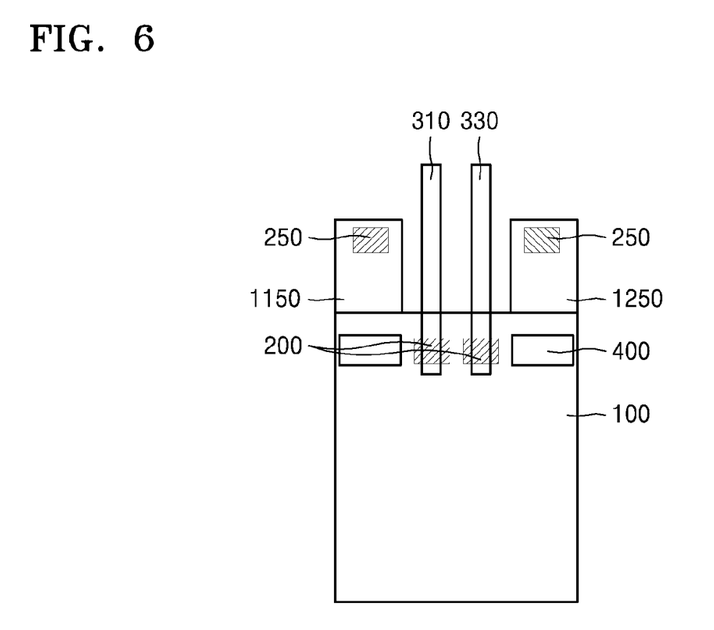
FIG. 6 is a plan view of a flexible secondary battery according to another exemplary embodiment.

In a flexible secondary battery of FIG. 6, according to another exemplary embodiment, a first electrode tab 310 and a second electrode tab 330 may be disposed inside a first protruding part 1150 and a second protruding part 1250, respectively.

In this case, first welding parts may be formed on a first embedded part and a second embedded part, respectively, which contact the first electrode tab 310 and the second electrode tab 330. As illustrated in FIG. 6, since the first welding parts 200 are formed in the central portion of the electrode stack assembly 100, the fixing member 400 may be formed outside of the first welding parts 200.

Therefore, as in the flexible secondary battery of FIG. 5, since one end of the electrode stack assembly 100 is fixed by the first welding part 200 and the fixing member 400, the flexible secondary battery may be stably fixed.

As in the flexible secondary battery of FIG. 5, the flexible secondary battery of FIG. 6 may further include second welding parts on the first protruding part 1150 and the second protruding part 1250.

When the electrode plates of the uncoated parts are broken by the repeated bending, the second welding parts 250, which are formed on the first protruding part 1150 and/or the second protruding part 1250, may provide an electron moving path, and thus, the flexible secondary battery may continue to function as a battery. In addition, the second welding parts 250 function to tightly fix the first protruding part 1150 and/or the second protruding part 1250, thus preventing the deformation of the flexible secondary battery.

One second welding part 250 is illustrated in FIGS. 5 and 6 as being formed on each of the first protruding part 1150 and the second protruding part 1250, but it is understood that the position, shape, and number of the second welding parts 250 are not particularly limited.

Figure 7:
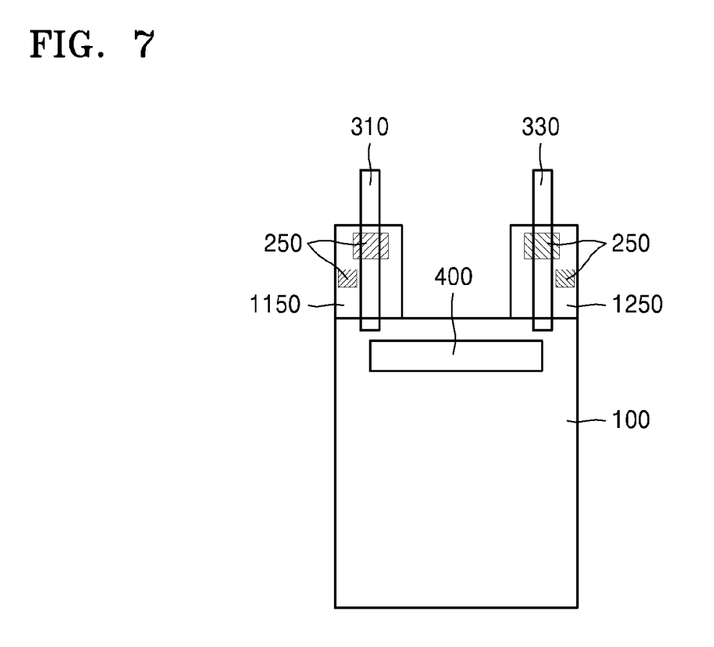
FIG. 7 is a plan view of a flexible secondary battery according to another exemplary embodiment.
Figure 8:
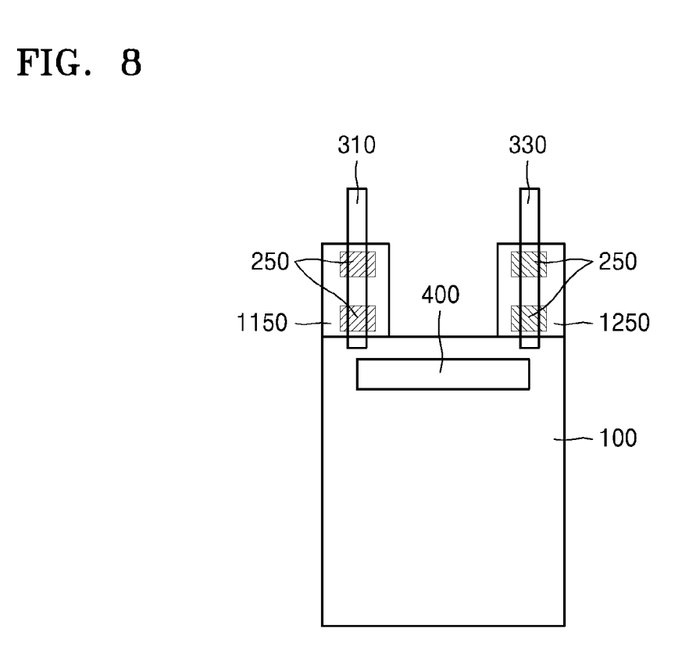
FIG. 8 is a plan view of a flexible secondary battery according to another exemplary embodiment.

FIGS. 7 and 8 are plan views of flexible secondary batteries according to various exemplary embodiments.

In the flexible secondary battery according to the exemplary embodiment, one end of a first electrode tab 310 and one end of a second electrode tab 330 may be disposed inside an electrode stack assembly 100 and may be stacked together with a first electrode plate 110, a second electrode plate 120, and a separator 130.

One end of the electrode stack assembly 100 may be fixed by a fixing member 400. In addition, second welding parts 250 may be further formed on a first protruding part 1150 and a second protruding part 1250, separately from the fixing member 400.

As described above, one end of the electrode stack assembly 100 is fixed by the fixing member 400, and electrons may move through the second welding part 250 even when the electrode plates of the uncoated parts are broken by the repeated bending As illustrated in FIGS. 7 and 8, the first electrode tab 310 and the second electrode tab 330 may be disposed on the first protruding part 1150 and the second protruding part 1250, respectively. However, it is obvious that the positions of the first electrode tab 310 and the second electrode tab 330 are not limited thereto.

When the first electrode tab 310 is positioned on the first protruding part 1150, the second welding part 250 may be formed at a position where the first electrode tab 310 and the first protruding part 1150 overlap each other. Alternatively, the second welding parts 250 may be formed on the first protruding part 1150 except for the position where the first electrode tab 320 is disposed.

The second welding part 250, which is formed at the position where the first electrode tab 310 and the first protruding part 1150 overlap each other, may function to more tightly fix the first electrode tab 320 to the first electrode plate 110.

The second welding part 250, which is formed on the first protruding part 1150 except for the position where the first electrode tab 310 is disposed, may function to provide an electron moving path when the electrode plates are broken.

Since the second welding part 250 formed on the second protruding part 1250 is substantially the same as the second welding part 250 formed on the first protruding part 1150, a description thereof will not be repeated.

It is understood that the position of the second welding part 250 is not particularly limited. As illustrated in FIG. 8, the second welding part 250 may be formed at only a position where the first electrode tab 310 and the second electrode tab 330 overlap the first protruding part 1150 and the second protruding part 1250, respectively.

As described above, according to the one or more of the above exemplary embodiments, the flexible secondary battery is capable of maintaining stability even after repeatedly bent or warped.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A flexible secondary battery comprising:
an electrode stack assembly including a first electrode plate, a second electrode plate, and a separator between the first electrode plate and the second electrode plate;
a first electrode tab electrically connected to the first electrode plate; and
a second electrode tab electrically connected to the second electrode plate,
wherein one end of the first electrode tab and one end of the second electrode tab are disposed inside the electrode stack assembly and are stacked together with the first electrode plate, the second electrode plate, and the separator to form the electrode stack assembly, wherein a remaining portion of the first electrode tab and a remaining portion of the second electrode are disposed outside the electrode stack assembly, and
wherein:
the electrode stack assembly has a rectangular shape,
the first electrode plate includes a first active material part coated with a first active material and a first uncoated part uncoated with the first active material, and the second electrode plate includes a second active material part coated with a second active material and a second uncoated part uncoated with the second active material,
the first uncoated part of the first electrode plate includes a first protruding part protruding from the rectangular electrode stack assembly, and a first embedded part that is a portion of the first uncoated part different from and not vertically overlapping the first protruding part,
the second uncoated part of the second electrode plate includes a second protruding part protruding from the rectangular electrode stack assembly, and a second embedded part that is a portion of the second uncoated part different from and not vertically overlapping the second protruding part,
a first welding part is formed on an outer surface of the first or second electrode plate, and binds at least one of i) the first embedded part of the first uncoated part of the first electrode plate and a portion of the first electrode tab and ii) the second embedded part of the second uncoated part of the second electrode plate and a portion of the second electrode tab, and
the first welding part is not formed on the remaining portions of the first and second electrode tabs.

2. The flexible secondary battery of claim 1, wherein:
the first uncoated part is located at a position where the first electrode plate and the first electrode tab contact each other, and
the second uncoated part is located at a position where the second electrode plate and the second electrode tab contact each other.

3. The flexible secondary battery of claim 2, wherein the first electrode tab and the second electrode tab are disposed inside the first protruding part and the second protruding part, respectively.

4. The flexible secondary battery of claim 2, wherein at least one of the first embedded part and the second embedded part is fixed by a welding process.

5. The flexible secondary battery of claim 1, wherein the first electrode tab is disposed on the first protruding part and the second electrode tab is disposed on the second protruding part.

6. The flexible secondary battery of claim 5, wherein at least one of the first protruding part, the first embedded part, the second protruding part, and the second embedded part is fixed by a welding process.

* * * * *